Jan. 8, 1957        J. J. LAWLOR        2,776,709

SCREEN FOR AUTOMOBILE WINDOWS

Filed Sept. 3, 1954

INVENTOR.
John J. Lawlor
BY
Marshall A. Burmeister
Atty.

United States Patent Office 2,776,709
Patented Jan. 8, 1957

2,776,709

SCREEN FOR AUTOMOBILE WINDOWS

John J. Lawlor, East Chicago, Ind.

Application September 3, 1954, Serial No. 454,020

6 Claims. (Cl. 160—378)

The present invention relates to insect screens for automobiles.

It is unfortunate that the summer months of the year are both the most desirable for the use of automobiles and the most undesirable from the point of view of insect and bug annoyances. Almost every automobile owner has experienced the annoyance of mosquitoes and other insects while enjoying an outdoor movie, or eating a sandwich at a drive in. Many sportsmen make use of their automobiles to sleep in while on sporting expeditions, and they too experience the annoyance of insects, or are forced to remain in the automobile with the windows closed.

The answer to the insect problem is further complicated by the fact that permanently attached screens to the automobile are undesirable in that they impair visibility. The insect annoyance is only a serious problem when the automobile is parked, because the rush of air past a moving vehicle is sufficient to prevent insects from entering a moving automobile. Hence it is an object of the present invention to provide an insect screen adapted for use on automobile windows that may be readily attached and removed from the automobile.

Insects have an exceedingly annoying habit of finding any apertures in a screen or any gaps left between the screen and the adjacent structure. It is therefore a further object of the invention to provide an insect screen adapted to be used to cover the windows of an automobile which forms a tight seal to the body of the automobile.

It is a further object of the present invention to provide an insect screen for use on automobile windows which is readily fabricated and inexpensive.

Other objects and advantages of the present invention will readily be devised by the man skilled in the art from a further reading of the present disclosure.

Since the inventor recognizes that most automobile owners prefer to drive their vehicles without screens, the screen constructed according to the teachings of the present invention is readily insertable and removable in the channel vacated by opening the window of an automobile. Stated broadly, the screen has a sheet of screen cloth which is approximately the same size as the glass within the window of the automobile, the edges of the screen are provided with a flexible strip which is secured to a frame adjacent to the strip, the frame abutting the body of the automobile adjacent to the window channels when the screen is disposed on the automobile. Each of the four corners of the frame is provided with a lug in the form of a bar diagonally disposed across the corners for the purpose of inserting and removing the insect screen. The invention may be more clearly understood when considered in the light of the drawings, in which:

Figure 1:
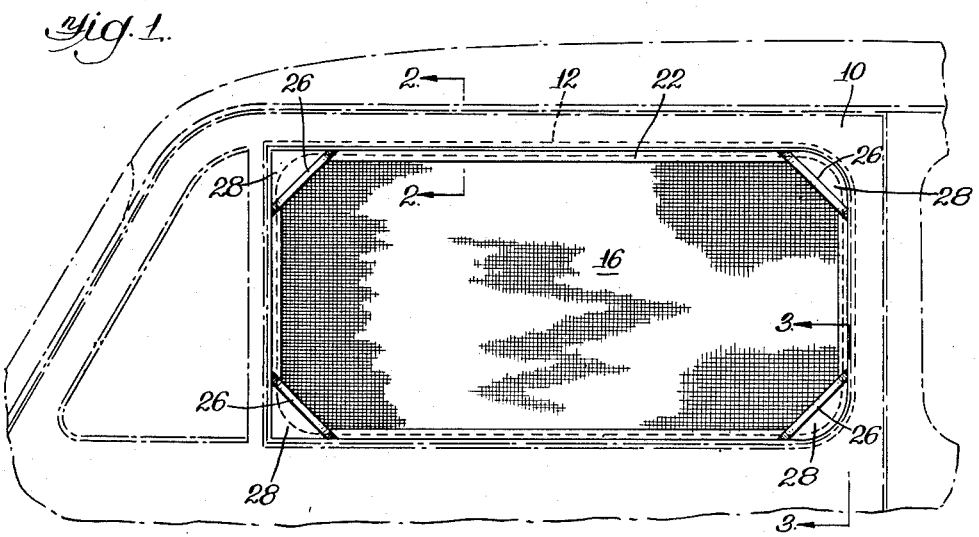
Figure 1 is an elevational view of an insect screen constructed in accordance with the present invention and attached to the body of an automobile.

Figure 1 illustrates the right front window of an automobile with the window retracted and the insect screen disposed in position. While different makes of automobiles differ in some details, they are sufficiently alike that a single screen design will fit most of the front windows of the automobiles manufactured by the American automobile industry. For automobiles with windows which differ greatly from the customary dimensions, the invention may be practiced by constructing a screen with dimensions chosen to fit the particular window. The front windows of most automobiles are disposed within a door frame 10 which is provided with a channel 12 having a felt or other soft lining 14. The channel 12 extends around the four sides of the window, the window being retractable into the door frame 10 through the bottom portion of the channel 12.

Figure 2:
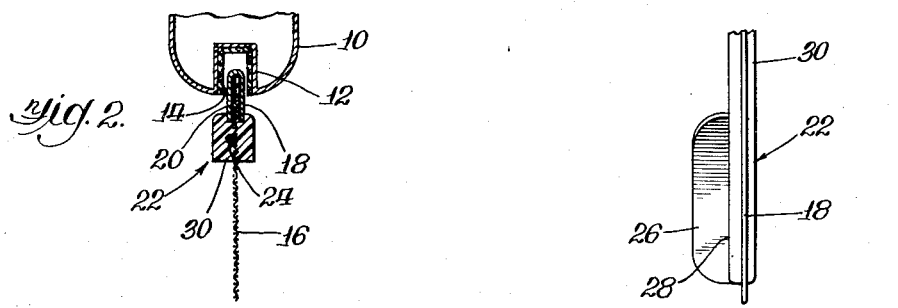
Figure 2 is a sectional view taken along line 2—2 of Figure 1.
Figure 3:
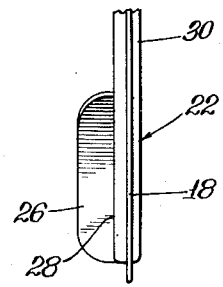
Figure 3 is an elevational view taken along the line 3—3 of Figure 1.

The window screen has a sheet 16 of screen cloth of sufficient size to extend into the channel 12 on all sides of the window. A flexible tape 18 is provided with a coating 20 of adhesive material and its coated surface is folded inwardly and disposed about the periphery of the sheet 16 of screen cloth. A frame 22 is attached to the edges of the flexible tape 18 and also attached to the sheet of screen cloth 18, as illustrated in Figure 2. Plastic forms a particularly satisfactory frame 22, since the plastic is poured through to both sides of the sheet 16 of screen cloth, thereby securely holding the sheet 16. A reinforcing wire 24 is disposed within the plastic frame 22 to give the frame 22 more rigidity.

Each of the four corners of the frame 22 is provided with a lug 26 in the form of a bar extending diagonally across the corner. It is actually only necessary to have protruding lugs disposed across the two bottom corners, since these are the lugs that abut the door frame 10 and secure the screen in place. The lugs, however, have the additional functions of reinforcing the corners of the screen and facilitating installation of the screen, so they are preferably disposed at all four corners of the screen. In the particular construction here described, the lugs 26 are a portion of the frame 22, and are constructed out of plastic in a single molding operation with the frame 22. At the corners, the frame 22 has a flat portion 28 which is an extension of a rectanglar portion 30 of the frame 22 which extends around the periphery of the screen sheet 16. The flat portion 28 terminates at the lug 26 and is also formed in the single molding operation.

The overall dimensions and contour of the frame 22 will vary in accordance with the shape and size of the windows of various automobile models. The inventor has found that a frame 22 with a rectangular portion 30 having a height of 1 foot and one inch, a length of 2 feet, measured from its outer surfaces, and a 2 inch corner radius will satisfactorily fit most of the American made automobiles, particularly popular models. He has also found that the depth of the channels 12 in the doors are generally 5/16 inch and the channels themselves are approximately 1/4 inch wide. For these reasons, he has found that the rectangular portion 30 of the frame 20 should have a thickness of approximately 1/4 inch and a height of approximately 5/16 inch, and that the flexible tape 18 should extend outwardly from the rectangular portion 30 of the frame 22 a distance of approximately 5/16 inch. The inventor has also found that rubber tape is very suitable for the flexible tape 18 and that a coating of rubber cement 20 will readily adhere to both the sheet 16 of screen cloth and to the tape 18. The screen cloth itself may be constructed of plastic, copper, aluminum, or any other conventional screening material, and an 18 x 24 mesh is satisfactory. The frame 22 measures approximately 3/4 inch thick through the lugs 26, and the lugs 26 are disposed approximately 2 inches from the adjacent corner of the frame 22 at their shortest distance, and are disposed at an angle of approximately 45 degrees relative to the horizontal portion of the frame.

Figure 4:
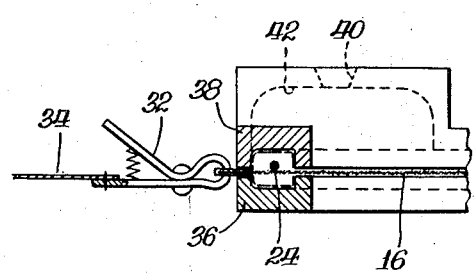
Figure 4 is a sectional view illustrating a fragment of the mold and clamps used to fabricate the insect screen.

The inventor has found that the screen may be readily and inexpensively constructed by the use of plastic molding methods. The strip of rubber tape 18 is first coated with rubber adhesive cement forming the coating 20. The tape 18 is then folded over so that the adhesive coated portions of the tape 18 confront each other, and the tape 18 is then secured about the periphery of the sheet 16 of screen cloth. The outer surfaces of the tape 18 are then clamped by clamps 32, illustrated in Figure 4, the clamps 32 being attached to an elastic member 34 which pulls the screen cloth 16 taut and holds it horizontal. The wire reinforcing member 24 is then disposed on the upper surface of the screen cloth 16 adjacent to the edges of the tape 18, and the lower mold 36 and upper mold 38 are clamped in place on opposite sides of the screen cloth 16, as illustrated in Figure 4. It is to be noted that the molds 36 and 38 are rectangular and that Figure 4 illustrates only the corner of the molds. The upper mold 38 is provided with a pouring aperture 40 at the top of a lug recess 42 at each corner of the screen. Plastic is then poured into the pouring aperture 40 at each corner of the screen and fills the lower and upper portions 36 and 38 of the mold and the lug recess 42. The inventor has found that the frame 22 is readily fabricated in this manner, inexpensive, and rigid. After the frame 22 has set, the upper and lower portions of the mold 36 and 38 are removed, the frame 22 is trimmed, and the screen is completed.

In order to insert the screen into the channels 14 of the automobile, the automobile window is first retracted into the door frame 10. The screen is then grasped by two of the lugs 26 and inserted into the channels 12 at the top, sides and bottom of the door window, the rectangular portion 30 of the frame 22 being pushed upwardly to abut against the door frame 10 in this operation. As a result of pushing the rectangular portion 30 of the frame 22 against the door frame 10, the outwardly extending flexible tape 18 at the bottom of the screen may be more readily inserted into the lower channel 12 of the door. The screen is then allowed to settle downwardly against the door frame 10 and the lugs 26 of the screen abut the door frame 10. In this manner, the four lugs 26 position the frame within the channels 12 and prevent it from sliding.

The man skilled in the art will readily devise many modifications of door window screens for repelling insects and many other uses for the screen disclosed here in detail. It is therefore intended that the scope of the present invention be not limited by the foregoing disclosure, but rather only by the appended claims.

The inventor claims the following as his invention:

1. A screen for an automobile window comprising a generally rectangular sheet of screen cloth, a flexible tape folded over the periphery of the screen cloth and abutting both sides thereof, a rigid frame attached to the inner edge of the folded flexible tape and to the screen cloth, the flexible folded tape and screen cloth extending outwardly from the frame and being adapted to slide into the window channels of the automobile.

2. A screen for an automobile window comprising a generally rectangular sheet of screen cloth, a flexible folded tape attached to the periphery of the screen cloth, an essentially rectangular frame disposed adjacent to the periphery of the screen cloth and attached to the tape, the frame being approximately ¼ inch thick and the tape extending at least ¼ inch therefrom, and four bar shaped lugs attached to the frame extending diagonally across the corners thereof to reinforce the corners of the screen and facilitate its installation, said lugs also extending to the edge of the frame and being adapted to abut the sill of the automobile opening to prevent the screen from dropping into the window channel of the automobile.

3. A screen for an automobile window comprising a generally rectangular sheet of screen cloth, a flexible folded tape attached to the periphery of the screen cloth, generally rectangular molded frame disposed adjacent to the periphery of the sheet of screen cloth and attached to both ends of the tape and the sheet of screen cloth, said frame extending through the screen cloth and being approximately ¼ inch thick, the tape extending at least ¼ inch away from the frame, and bar shaped lugs attached to the frame and extending diagonally across the four corners of the frame, said lugs extending outwardly at least ½ inch from the frame to prevent the screen from sliding into the window channel of the automobile when attached thereto.

4. A screen for an automobile window comprising the elements of claim 3 in combination with a wire reinforcing member disposed adjacent to the screen cloth within the molded frame, said member being approximately the same shape as the frame and extending along a path adjacent to the periphery of the screen cloth.

5. A screen for an automobile window comprising a generally rectangular sheet of screen cloth, a flexible tape folded over the periphery of the screen cloth and abutting both sides of the screen cloth, a rigid frame attached to the inner edges of the folded flexible tape and to the screen cloth, the flexible folded tape and screen cloth extending outwardly from the frame and being adapted to slide into the window channels of an automobile, and a pair of bar shaped lugs attached to adjacent corners of the frame and extending diagonally across said corners of the frame, said lugs extending outwardly from the frame and being adapted to abut the sill of the automobile opening to prevent the screen from dropping into the window channel of the automobile.

6. A screen for a window of an automobile having a frame with a window channel therein and a downwardly retractable window slidably disposed within the frame comprising a generally rectangular sheet of screen cloth, a flexible folded tape attached to the periphery of the screen cloth, an essentially rectangular frame having a thickness less than the width of the window channel disposed adjacent to the periphery of the screen cloth and attached to the tape, the tape extending outwardly from the frame, and four bar shaped lugs attached to the frame and extending diagonally across the corners thereof to reinforce the corners of the screen and to facilitate its installation, said lugs also extending to the edge of the frame and being adapted to abut the sill of the automobile to prevent the screen from dropping into the window channel of the automobile.

References Cited in the file of this patent

UNITED STATES PATENTS

| 1,756,227 | Torrent | Apr. 29, 1930 |
| 2,598,770 | Drozt | June 3, 1952 |
| 2,643,711 | Smith | June 30, 1953 |